Dec. 22, 1964  R. S. GENTRY ETAL  3,161,992
AUTOMATIC LAPPING MACHINE TOOL
Filed March 18, 1963  4 Sheets-Sheet 2
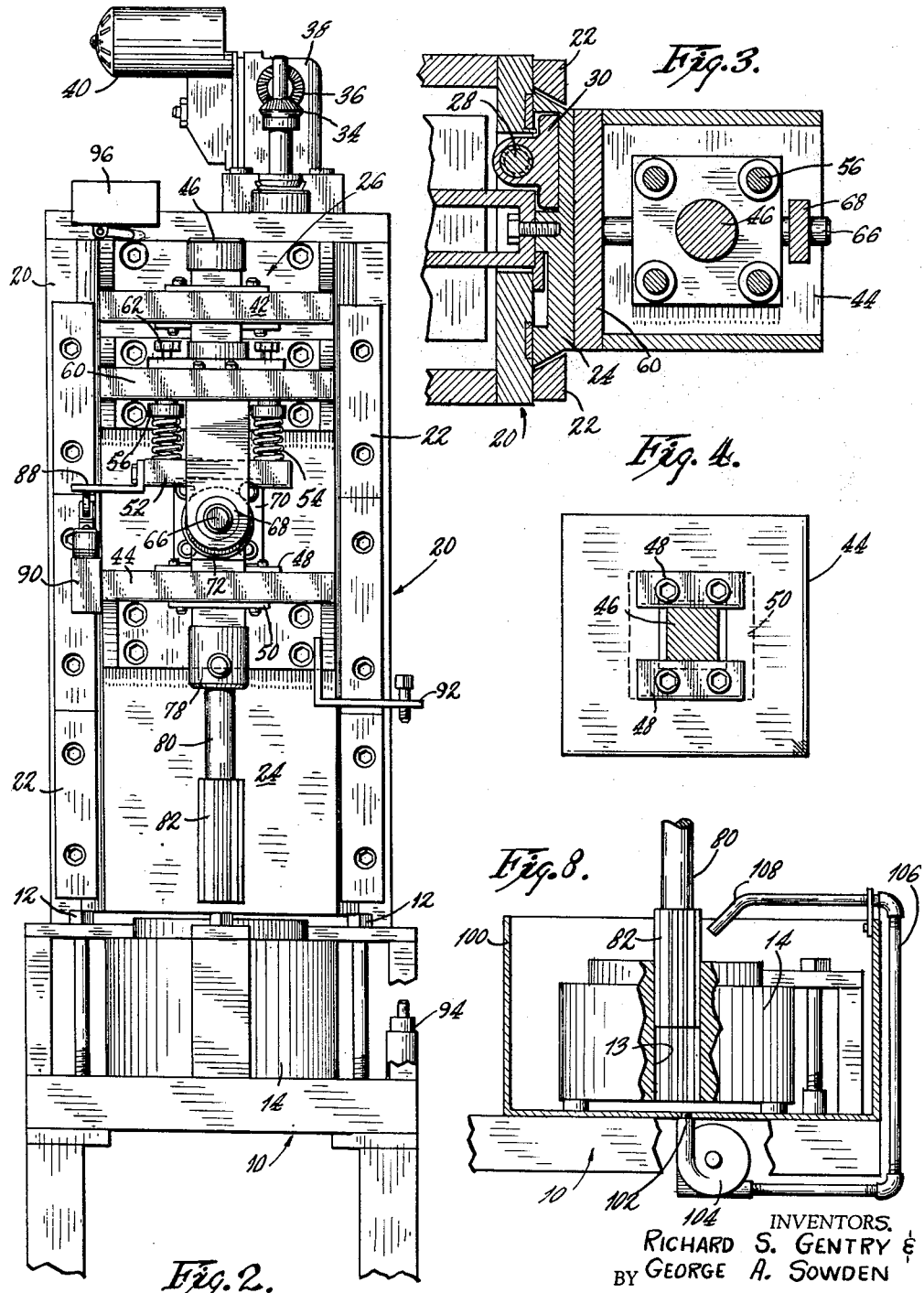
INVENTORS.
RICHARD S. GENTRY &
BY GEORGE A. SOWDEN
ATTORNEYS.

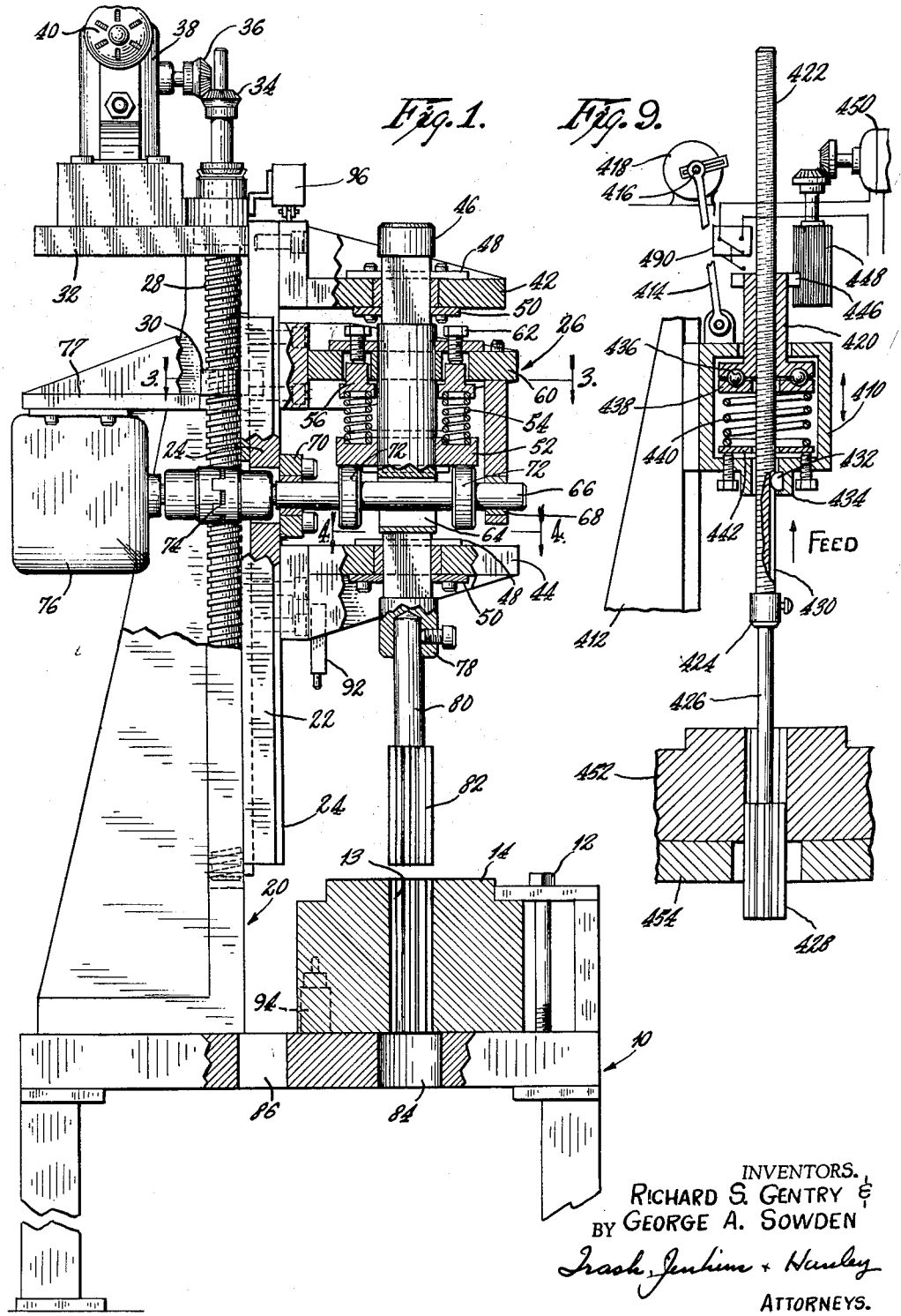

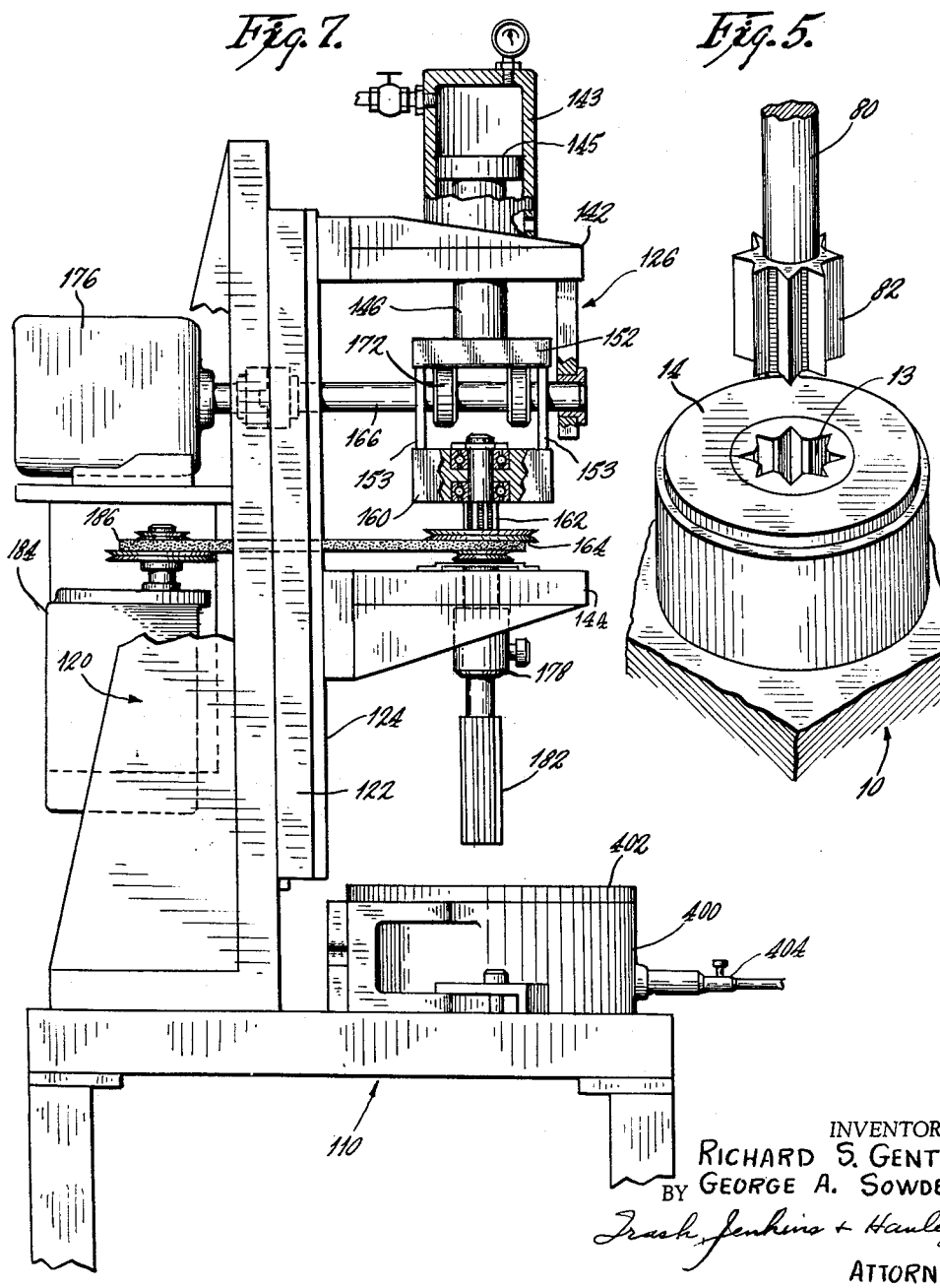

INVENTOR.
RICHARD S. GENTRY &
BY GEORGE A. SOWDEN
ATTORNEYS.

3,161,992
Patented Dec. 22, 1964

3,161,992
AUTOMATIC LAPPING MACHINE TOOL
Richard S. Gentry and George A. Sowden, Perry Township, Marion County, Ind., assignors to Gentry Carbide Tool & Die Co., Inc., Beech Grove, Ind., a corporation of Indiana
Filed Mar. 18, 1963, Ser. No. 265,844
22 Claims. (Cl. 51—34)

This invention relates to a machine tool for automatically performing lapping and like abrading and metal-finishing operations.

In machine-tool manufacture, lapping is used as a finishing operation for both interior and exterior surfaces of dies and other tools, in order to obtain dimensional accuracy and surface finish quality to a degree not obtainable, or more difficultly obtainable, by other means. In a lapping operation, a lapping tool, referred to as the "lap," is supplied with cutting medium such as diamond, carbide, or other cutting grit, and is reciprocated with or without relative rotation in rubbing engagement with the surface to be finished, to produce a surface cutting action, and the reciprocating lap is progressively fed along the surface. The lap is normally of softer and more ductile material than the die or workpiece, and the cutting medium is or becomes embedded in the surface of the lap. The cutting medium may be embedded in the lap in advance, and the lapping performed dry or with a coolant liquid, or the cutting medium may be supplied during the lapping operation as in a slurry or paste containing the cutting grit in a liquid or other carrier. The size of the grit used is carefully selected to control the amount of stock removed and the surface finish produced.

The lapping of a die cavity, such as a cylindrical hole, is referred to to exemplify the operation. The die cavity is formed by conventional machine tool operations, to within their tolerance limits of the desired size and configuration. The lap is accurately formed to a size and configuration appropriate to produce the desired final cavity and surface finish, and will have a relatively close-tolerance fit in the rough formed cavity. In the lapping operation, the lap is axially reciprocated, and progressively advanced into and along the formed cavity, with cutting media carried by or supplied to the surface of the lap. The mechanical support and movement of the lap has been obtained in the past by the use of various machine tools, for example, a drill press, in order to maintain the necessary alignment of the lap with the workpiece during the lap movement. Great care must be exercised, however, to prevent excessive contact pressure between the lap and the cavity surface, for such excess pressure tends to cause galling of the surface of the lap and consequent errors and defects in the surface being lapped, and may completely ruin an already expensive die by such galling in the lapping operation used for finishing.

In lapping a surface such as that of a die cavity, where the reciprocating lap is progressively fed into the cavity, the lap tends to wedge or bind in the cavity as it progresses into the cavity, and such wedging tends to produce excessive contact pressures and consequent galling. Because of this danger, it has heretofore been necessary to control the lapping movements manually, in a manner which permits the operator to regulate the feed by feel. Such manually-controlled lapping requires a skilled operator and is an extremely slow and tedious operation requiring many man-hours to complete.

Because of these requirements of prior lapping procedures, it has been necessary in preliminary machining operations to form the workpiece within very close tolerances of its desired final size, shape and surface finish in order to reduce the amount of lapping required to bring it to exact size, shape and surface finish. This necessity for close tolerances in the preliminary machining operations has, in many cases, greatly increased the time and expense required for their performance and has required the use of relatively expensive machine tools, whereas less expensive machines could be used, and less time and expense would be required if greater tolerance were permitted in the preliminary operations and if lapping could be used to a greater extent for producing the desired final results.

It is the object of the present invention to provide a machine for performing lapping and like operations which will be automatic in its operation and will not require control by the feel of the operator, which will avoid the danger of galling, and which may be power driven and will perform the lapping process more rapidly and more safely than under manual control. It is a further object of the invention to provide such a lapping machine which will permit greater stock removal in the lapping operation and will produce an accurate and true surface on the workpiece. It is a further object of the invention to provide a lapping machine and control therefor which will automatically progress through a complete lapping operation cycle and will then withdraw the lap from the work. It is also an object of the invention to provide a lapping machine which will permit the use of greater tolerances in preliminary machining operations and thus reduce the expense of preparing the workpiece ready for lapping, and which by increasing the effectiveness and reducing the time and expense of lapping, will further reduce the overall expense of producing true and accurate dies and like machine tool elements.

In lapping apparatus, either the lap or the workpiece or both may be moved to obtain the lapping action. For convenience, these will be regarded as equivalents, and the invention described by considering the lap as the movable element.

In accordance with the invention, the lap is mounted for rectilinear reciprocation in a predetermined stroke range, with or without rotation, and provision is made for feeding movement which advances the position of the lap stroke range relative to the workpiece. The mechanism which feeds and reciprocates the lap includes a yieldable or force-limiting means which limits the force with which the lap is driven forward, to a force which is preferably variable and which is less than sufficient to overcome a predetermined resistance of the workpiece to forward lapping movement of the lap. Accordingly, as lap reciprocation occurs, the workpiece resistance will arrest each forward stroke movement of the lap at an intermediate point in the stroke range, and the drive means will then reciprocate the lap between the rear limit of its stroke range and this intermediate point at which the lap is arrested by the workpiece resistance. This forwardly-arrested reciprocation will produce a lap-cutting action which, as it progresses, will allow the lap to progressively advance farther forward in its stroke range, so that the point of arrest will correspondingly progress forward, toward the workpiece and toward the forward limit of the stroke range. Such forward progression is sensed by a suitable sensing device, in response to which the feeding means advances the lap stroke range forward toward the workpiece, and hence forward relative to the point at which the lap is arrested in its forward reciprocation stroke. Desirably, the feed rate is limited to a predetermined maximum, to ensure a progressive lapping action. As above described, the feed is responsive to the progress of the lapping action, while the lap working force is limited to a predetermined magnitude, which is made less than sufficient to create danger of galling. Desirably, the means which limits the force of the forward stroke movement of the lap is arranged to control both the thrust force and the velocity of such movement, in order to control inertial forces as well as static thrust.

In a preferred embodiment of the invention, the lap is mounted on a lap shaft arranged for rectilinear reciprocation, with or without rotation, in a carriage which itself is mounted for linear feeding movement parallel to the reciprocation and relative to a workpiece support. The lap shaft carries a cam follower and is yieldingly biased forward in the carriage with its follower against a cam on a shaft journalled in the carrier. The cam is mechanically driven and acts to positively move the lap shaft axially in a retraction stroke and to limit the rate at which it is moved forward by its forward bias. The connection between the cam and its follower is a lost-motion connection which permits the forward strokes of the lap shaft to be arrested at any point in the stroke range by reaction of the lap against the work. By such arrangement, the force with which the lap is moved forward into the work is a yielding force of predetermined, limited, and controllable magnitude, which can be made to suit the particular lapping operation and sufficient to produce the desired lapping but insufficient to drive the lap into galling relationship with the work.

The lap-shaft carriage is fed forward in short increments by a feed motor controlled in response to the position at which the forward strokes of the lap shaft are arrested, as by means of a switch fixed on the carriage in position to be closed by an arm movable with the lap-shaft whenever the lap shaft moves beyond a certain point in its stroke range.

Where the surface to be lapped is of cylindrical configuration, the lap-shaft may be rotated during the lapping operation, which aids in maintaining trueness with the axis of the lap. Also, the workpiece may be rotated, which aids in obtaining true concentricity between the lapped surface and the axis of workpiece rotation.

The accompanying drawings illustrate the invention. In such drawings:

FIG. 1 is a side elevation of a machine embodying the invention, showing certain parts in section;

FIG. 2 is a front elevation of the machine shown in FIG. 1;

FIG. 3 is a section on the line 3—3 of FIG. 1;

FIG. 4 is a section on the line 4—4 of FIG. 1;

FIG. 5 is an isometric view showing a lap and die having a non-circular configuration, the die being of the type used for compacting powdered metal gear blanks;

FIG. 7 is a side elevation of a modification in which the lap and work holder are rotatable;

FIG. 8 is a partly sectioned view of a modification which provides for recirculating a cutting fluid or a liquid lapping compound;

FIG. 9 is a diagrammatic view of a modification embodying several variations, and in which the lap engages the work from below and its forward strokes are upward, and the feed is obtained by advancing the lap shaft relative to the reciprocating mechanism.

Figure 6:
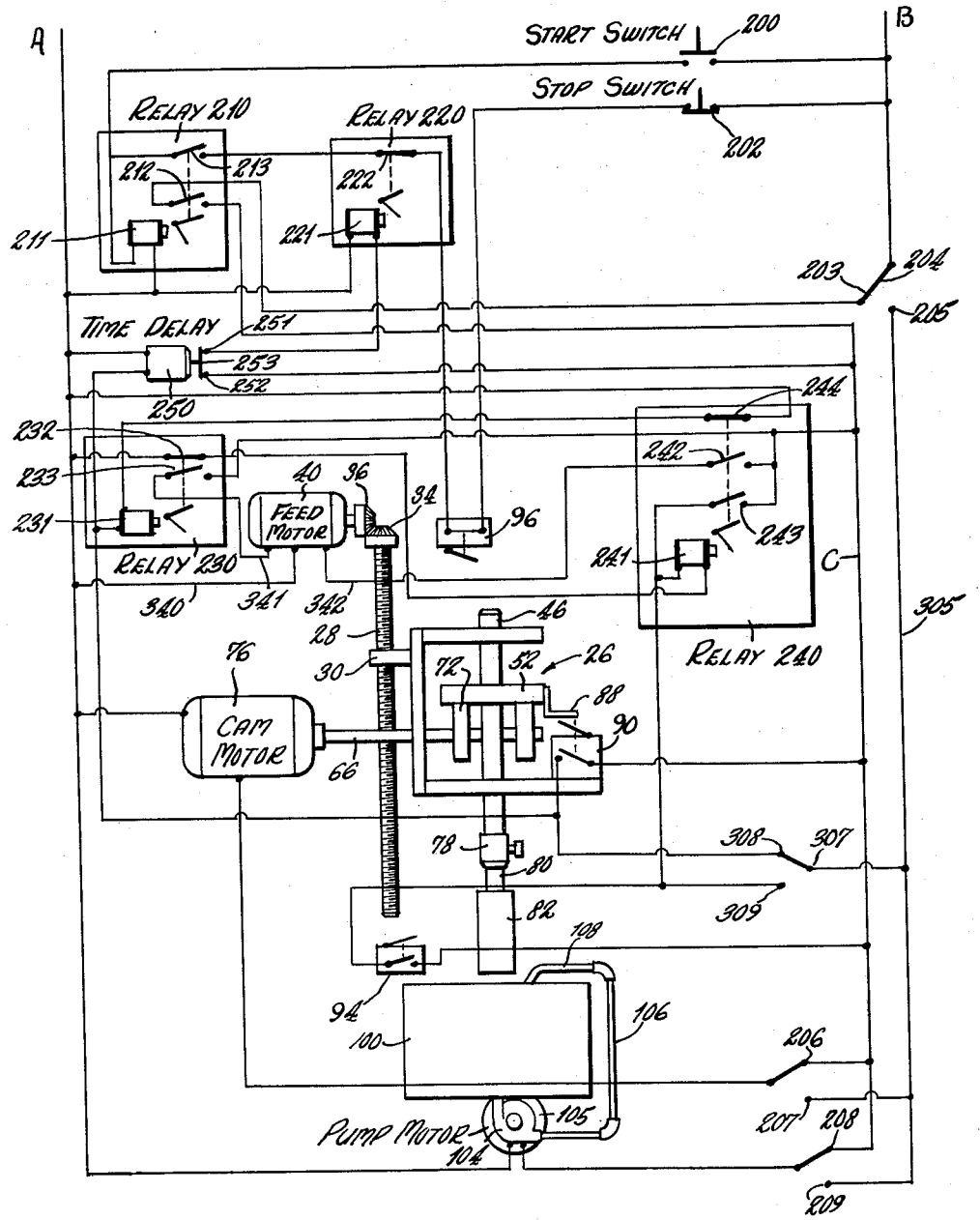
FIG. 6 is a wiring diagram of the machine shown in FIG. 1.

The machine shown in FIGS. 1–4 comprises a table forming a workpiece support and provided with a plurality of threaded holes for the reception of clamp bolts 12 by which a workpiece such as a die 14 may be clamped in place on the table 10. The table carries a fixed standard 20 provided with guide surfaces and gibs 22 forming a vertical slideway for the dove-tail base 24 of a vertically movable carriage 26. Certain intermediate portions of the standard 20 are cut out to permit the projection therethrough of certain operating parts hereinafter described, and the movement thereof with the carriage 26 during the lapping operation.

The carriage 26 is arranged to be raised and lowered by a feed screw 28 extending vertically behind the standard 20 and engaged by a threaded runner 30 fixed to the carriage 26. The upper end of the feed screw 28 is rotatably mounted in bearings in a bracket 32 carried at the top of the standard 20, and the feed screw is arranged to be driven by a pair of bevel gears 34 and 36 which are driven from a reduction gear unit 38 operated by a feed motor 40.

The carriage 26 comprises a pair of end plates 42 and 44 having aligned openings for the reception of the lap shaft 46. Where such shaft passes through the plates 42 and 44, it is of square cross section, and is engaged by two pairs of opposed guide plates 48 and 50, which guide it for rectilinear reciprocating motion relative to the carriage 26.

Between the two plates 42 and 44, the shaft 46 carries a cam-follower or lift plate 52, which is spring pressed downward by a set of biasing springs 54, reacting against adjustable thrust members 56 mounted in a reaction plate 60 fixed to the dove-tail base of the carriage 26. Desirably, the thrust members 56 are slidable in the reaction plate 60 and are adjustable by means of adjusting screws 62. Beneath the lift plate 52, the lap shaft 46 is provided with a transverse aperture 64 for the passage of a cam shaft 66 which is journalled in an outboard bearing 68 carried from the reaction plate 60 and an inboard bearing 70 fixed to the dove-tail base 24 of the carriage. The cam shaft carries two cams 72 engaged by the lift plate 52, and is driven through a coupling 74 from a cam drive motor 76 mounted on a bracket 77 on the carriage base 24.

The lower end of the lap shaft 46 carries a chuck 78 for the reception of the shank 80 of a lap 82 suitably formed to lap the cavity 13 in the die 14.

The table 10 is conveniently provided with clearance openings 84 and 86, respectively for the passage therethrough of the lap 82 and the lower end of the dove-tail base 24 of the carriage 26.

As shown in FIG. 2, the lift plate or cam follower 52 carries a switch-actuating arm 88, and the lower plate 44 of the carriage 26 carries a feed control switch 90, positioned to be closed by the switch arm 88 at a predetermined intermediate point in the range of stroke movements of the cam follower 52 produced by rotation of the cams 72.

The carriage 26 carries a switch-actuating arm 92, positioned to close a feed-reversal switch 94 mounted on the table 10. The standard 20 carries a stop switch 96, positioned to be actuated by the upper end of the carriage 26.

Operation of the device of FIGS. 1–4 is as follows: The die 14 is fixed in place on the table 10 in axial alignment with the lap shaft 46, and the lap 82 is fixed in the chuck 78 of the lap shaft coaxial with the cavity 13 of the die 14. The formation and preparation of the lap 82 follows conventional practice, and it is assumed for convenience of description of the machine that the lap 82 carries the cutting medium imbedded in its surface, and that it is supplied during operation with a cooling liquid carried to it by conventional means not shown in FIGS. 1–4. In preparation for the lapping operation, the carriage 26 may be manually fed downward by suitable manual actuation of the feed motor 40 to bring the lap 82 to a suitable starting position relative to the die 14. The motor 76 is then actuated to continuously drive the cam shaft 66, with the result that, in the absence of resistance from the work, the cams 72 will cyclicly lift the cam follower or lift plate 52 fixed to the lap shaft 46, and will thus continuously reciprocate the lap shaft 46 in vertical strokes through a predetermined stroke range fixed by the eccentricity or shape of the cams 72, which may be of the order of from a fraction of an inch to several inches. In one embodiment the stroke range of the abrading tool or lap was ⅜ inch. In such reciprocation, the lap shaft 46 will be positively driven through its upward or retraction strokes, but is yieldingly driven through its downward or advance strokes by the biasing springs 54, and the rate of its movement through its downward strokes under the biasing force will be controlled by the cams 72, since, in the absence of other influences, the downward bias on the cam follower will hold it in engagement with the surfaces of the cams 72 during such downward strokes.

As the cam follower or lift plate 52 proceeds in each downward stroke, the switch arm 88 which it carries will, at a predetermined point in the stroke range, engage the feed-motor control switch 90, to close that switch and hold it closed during the remainder of the downward stroke and until the arm 88 rises above its switch-closing point in the next subsequent upward stroke of the lift plate 52. Closure of the switch 90 will actuate the feed motor 40 to rotate the feed screw 28 and lower the carriage 26 to progressively feed the reciprocating lap 80 into the cavity 13 of the die 14. The momentary time period during which the switch 90 is closed and the feed rate of the feed motor 40 and feed screw 28 are arranged to provide, in response to each switch closure, an incremental feed movement equal to a fraction of the stroke range, say of the order of 0.010 to 0.100 inch when the reciprocation throw is of the order of one inch or less. The feed increment will depend on the character and spring rate of the biasing means and should be such as to maintain the forward-stroke force less than the predetermined limit mentioned below. As the reciprocating lap enters into working relation with the surface of the cavity 13, the lap 82 will encounter resistance to its downward reciprocating-stroke movement under the influence of the biasing springs 54, and this resistance will progressively increase as the reciprocating lap 82 is fed deeper into the cavity 13. At some point, this resistance of the work will equal the force with which the biasing springs 54 urge the lap 82 and lap shaft 46 forward in its downward stroke. The resistance will then arrest the movement of the lap and lap shaft 46 at a point which may be referred to as the arrest point. When this arresting occurs at a point above the point of engagement of the switch-actuating arm 88 with the feed motor control switch 90, the feed motor will remain inactivated, while the rotating cams continue reciprocation of the cam follower 52 and lap shaft 46 through only part of the full-stroke range provided by the shape of the cams 72. Such partial stroking will occur for the reason that, as the lap shaft and lap move forward in a downward stroke, the stroke will be interrupted at an intermediate point—the arrest point— and the lap and lap shaft will be held stationary by the reaction of the work to the lap, and such parts will not complete the downward stroke of reciprocation. As the cams 72 continue to rotate, however, they will leave the lift plate or cam follower 52 and will then subsequently reengage such lift plate 52 to positively drive the lap shaft 46 upward through the upper portion of its retraction stroke. This partial-stroke reciprocation of the lap and lap shaft 46 will continue, and the cutting action of the lap 82 will continue by reason of such reciprocation, until the cutting action of the lap progresses to a point which reduces the arresting resistance of the work to the lap, and permits the lap to enter deeper into the cavity 13. In other words, as the lap cutting action progresses, the point at which the lap is arrested in its downward strokes will also progress, downward, until the switch-actuating arm 88 carried by the cam follower 52 again closes the feed-motor control switch 90 at the downward end of each reciprocation stroke. Such switch-closing will activate the feed mechanism to feed the carriage 26 downward and thus lower the position of the switch 90 with respect to the arrest point at which the switch-actuating arm 88 stops in the reciprocating movements of the lap and lap shaft 46. This cycle of events will be continuously repeated.

Accordingly, the lap is continuously reciprocated rectilinearly in lapping engagement with the surface of the cavity 13 of the die 14. The force with which the lap is thrust downward into the cavity 13 will be limited by yielding of the biasing springs 54, to a magnitude which produces lap cutting action but which avoids danger of galling. When the resistance of the work to downward movement of the lap exceeds this predetermined magnitude, the downward feed of the reciprocating lap 82 will be interrupted until the lap has cut sufficiently to eliminate such resistance. The feed is then activated to advance the reciprocating lap 82 toward the work 14 by an incremental fraction of the stroke length. An equilibrium condition is obtained in which the feed of the reciprocating lap is proportioned to the rate of progress of the lap cutting action.

The controlled feed continues until the reciprocating lap has completed lapping the entire length of the cavity 13 of the die 14 so that such die no longer offers the necessary resistance to arrest the downward stroke of the reciprocating lap shaft. The carriage 26 will then continue feeding downward until the switch-actuating arm 92 has engaged the feed-reversing switch 94, and this reverses the feed mechanism to raise the carriage and its associated mechanism to the top of the standard 20. At this point, the carriage 26 engages the stop switch 96 which shuts off both the feed motor 40 and the cam shaft drive motor 76 and terminates the automatic cycle of the machine.

FIG. 6 shows electrical supply and control means for obtaining the above-described operation of the machine of FIGS. 1–4. A pair of supply leads A and B are arranged for connection to a source of electricity. The control mechanism includes a normally-open start switch 200, a normally-closed stop switch 202, and a selector switch 204 movable between a contact 203 for automatic operation and a contact 205 for manual operation. The contact 203 of such selector switch is connected to the switch 212 of a main relay 210 which, when closed, connects the main lead B to a main lead C for automatic operation. The relay 210 also includes a holding switch 213. The coil 211 of the relay 210 is connected between the supply lead A and such holding switch 213, and the opposite side of the switch 213 is connected through the normally-closed switch 222 of a relay 220 having an energizing coil 221, and thence through the normally-closed stop switch 96 and the normally-closed manual stop switch 202 to the opposite lead B.

The start switch 200 is connected between the coil 211 of the relay 210 and the main lead B, so that its closure will momentarily close the relay 210, which will then hold itself closed through the closure of switch 213, assuming the switches 222, 96, and 202 are in closed position.

When the main lead C for automatic operation is energized through the relay switch 212, this energizes the motor 76 for the cams 72 which reciprocate the lap shaft 46. The connection is through a switch 206 shown in position for automatic operation, but which may be moved to engage a contact 207 connected by a wire 305 to the contact 205 of the selector switch 204, to permit manual closure of the circuit to the cam-drive motor 76.

The feed-motor control switch 90, which is positioned to be closed by the reciprocating movement of the cam follower 52 on the lap shaft 46, is a normally-open switch connected between the main lead C and the energizing coil 231 of a down-feed relay 230, the opposite side of such coil 231 being connected to the lead A through a normally-closed interlock switch 244 of a withdrawal relay 240. The down-feed relay 230 includes a normally-closed interlock switch 232 connecting the lead A to the energizing coil 241 of the relay 240, and a normally-open down-feed switch 233 for energizing the feed motor 40 in a direction to feed the carriage 26 downward. The feed motor 40 is connected by a common wire 340 to the lead A, and by a wire 341 to such down-feed switch 233, the opposite side of such switch being connected to the main lead C. Accordingly, whenever the switch 90 is closed during reciprocation of the lap shaft, it closes the relay 230 to energize the feed motor for downward feed drive.

For reverse-feed operation, as to withdraw the lap from the work, the feed motor 40 is connected for reverse operation or "up drive" by a wire 342 to a normally-open switch 242 of the relay 240, the opposite side of which switch is connected to the main lead C. The relay 240 also includes a hold switch 243 connected between the coil 241 and the main lead C. For closing the relay 240, its coil 241 is also connected to the limit switch 94 positioned to be closed when the carriage completes its downward feed. When such switch 94 is closed, it closes a circuit through the normally-closed switch 232 of relay 230 and the energizing coil 241 of the relay 240, to close such relay 240. This closes the hold switch 243 of the relay 240 to hold it closed. It also opens the normally-closed switch 244 in circuit with the holding coil 231 of the down-feed relay 230, to inactivate such relay 230 and prevent its closure to connect the feed motor for down drive. The relay 240 also, by its switch 242, energizes the feed motor for up drive, and the up-drive circuit is maintained by the held relay until the carriage 26 engages and opens the stop switch 96 to open the holding circuit of the relay 210 and release that relay to de-energize the main lead C.

For manual operation of the feed motor 40, the manual-control wire 305 is connected to a switch 307 which may be closed to either of two contacts 308 or 309. The contact 308 is connected to the energizing coil 231 of relay 230 for closing that relay for down feed of the feed motor 40, while the contact 309 is connected to the coil 241 of relay 240 to close that relay for up-feed of the feed motor 40.

In the event, in the operation of the lapping machine, the automatic forward or down feed of the reciprocating lap shaft should fail to occur for a prolonged period, for example, in the event the lap ceases to cut the work, it is desirable to automatically stop the machine. The time delay unit 250 and the relay 220 are provided for this purpose. The time delay 250 comprises a pair of contacts 251 and 252 which are normally closed by a bar contact 253. The time delay device is conventional, and when energized retracts the bar contact 53 from the contacts 251 and 252 to open the switch and to hold its switch open for a variable predetermined time, say five minutes. The time delay 250 is connected to be energized each time the switch 90 is closed by the reciprocating cam follower on the lap shaft, so that it will hold the switch 251–253 open for a period of five minutes following each closure of the switch 90. In the event the lap fails to cut and feed so that the switch 90 fails to close for a period of five minutes, the time delay will close the switch 251–253, and this will energize the coil 221 of relay 220, to actuate such relay to open its normally-closed switch 222. This will break the holding circuit of the relay 210 and stop the machine.

In the foregoing description of FIGS. 1–4, it was assumed that the lap was pre-imbedded with cutting media, and was operated with a cooling liquid supplied thereto. The modification shown in FIG. 8 provides for recirculating a cooling liquid, and permits wet-lapping operation. In this modification, the die 14 is mounted on the table 10 in a pan 100, adapted to contain a quantity of liquid. This is connected through a drain opening 102 to a pump 104 driven by a suitable motor 105 (shown in FIG. 6) and discharging through a pipe 106 to a delivery nozzle 108 which discharges the liquid to the lap 82 at the top of the cavity 13. When a pre-coated lap 82 is used, the modification shown in FIG. 8 may serve to recirculate liquid for cooling and lubricating the lap and to flush away particles cut from the work surface by the operation of the lap 82.

Additionally, the apparatus shown in FIG. 8 may be used for wet-lapping operations in which the cutting medium is supplied as a suspension in a liquid carrier. In such case, the pump 104 recirculates the cutting mixture to the lap 82 during the lapping operation.

As shown in FIG. 6, the pump 104 is driven by a motor 105 connected between the lead A and a selector switch having a first contact 208 connected to the main lead C for automatic operation and a second contact 209 connected to the manual control wire 305. When the switch is connected to the contact 208, the pump motor is energized concurrently with the cam-drive motor 76, by closure of the relay 210. When the pump motor switch is connected to its contact 209, the pump is energized when the selector switch 204 is set for manual operation.

In the lapping process, as conventionally practiced, increased accuracy of concentricity between the lapped surface and the axis on which the lap reciprocates can be obtained by continuously rotating the reciprocating lap. In addition, enhanced accuracy of concentricity between the surface being lapped and the axis of the workpiece can be obtained by rotating the workpiece during the lapping operation. The apparatus shown in FIG. 7 permits either or both of these effects to be produced in a machine which otherwise has the advantages of the machine of FIGS. 1–4.

The machine of FIG. 7 comprises a work table 110 which supports a standard 120 providing guides 122 for the base 124 of a carriage 126. Intermediate portions of the standard 120 are cut away for connection of the cam shaft 166 to its drive motor 176 and for other connections as described below. The carriage 126 is provided with a feed mechanism like that shown in FIGS. 1–4 but omitted from FIG. 7 for convenience of illustration.

The carriage 126 comprises two spaced guide plates 142 and 144. An upper shaft 146 is mounted for rectilinear, nonrotatable reciprocation in the upper plate 142, and carries a cam follower or lift plate 152, normally engaged against cams 172 on the shaft 166. The lap-shaft assembly is biased downward by air pressure. An air cylinder 143 is fixed on the guide plate 142 and acts on a piston 145 carried by the upper end of the shaft 146. The bias is adjustable by varying the air pressure. The cam follower 152 is connected by rods 153 to a lap shaft bearing plate 160 in which the upper end of a rotatable lap shaft 162 is mounted, as in ball bearings. Immediately below the bearing plate 160, the lap shaft 162 is splined for the reception of a driving pulley 164 by which such shaft can be rotated. The shaft 162 is supported for rotation and reciprocation in a suitable bearing in the bottom plate 144 of the carriage 126, and is provided with a chuck 178 at its lower end for the reception of a lap 182. A lap-rotation drive motor 184 is mounted in depending relation from the bracket supporting the motor 176, and is connected by means of a belt 186 to the pulley 164 on the rotatable lap shaft 162.

For rotation of the die or other workpiece in the machine of FIG. 7, the table 110 is provided with a conventional rotary work table 400, which has a top face plate 402 to which the work is secured and which is rotated about a predetermined axis by an air motor supplied with air through a valve 404.

The modification shown in FIG. 7 is provided with the same switch and control mechanism as the machine of FIG. 1. In particular, the cam follower 152 is provided with a switch closing arm like arm 88 in FIG. 1, positioned to close a feed-motor control switch like the switch 90 in FIG. 1 to obtain the control operation previously described.

In addition, during the lapping operation, the lap 82 may be rotated at a desired speed while it is being reciprocated by the cams 172 driven by the motor 176.

Also, the workpiece mounted on the face plate 402 can be rotated during the lapping operation by the rotary drive provided by the conventional rotary work table 400.

The modification shown in FIG. 9 embodies a number of variations from the machine of FIGS. 1–4. These include the fact that the lap enters the work from below and that its forward movements are in an upward direction. Also, the feed is obtained by advancing the lap shaft relative to the reciprocating mechanism rather than by feeding a carriage on which the reciprocating mechanism is supported. Also, the force-limiting means is interposed between the reciprocating mechanism and the lap rather than between the lap shaft and a fixed part of the carriage.

In this modification of FIG. 9, a cage 410 is mounted for rectilinear reciprocation on a fixed standard 412, and is reciprocated vertically by a connecting rod 414 driven by a variable throw crank 416 on a motor 418. An internally threaded runner 420 is slidably and rotatably mounted through an aperture in the top wall of the cage 410, and a threaded lap shaft 422 is threaded through the runner 420. The lower end of the lap shaft 422 carries a chuck 424 for the reception of the shank 426 of a lap 428. The lap shaft 422 is provided with a longitudinal key slot 430 and is held against rotation by a key 432 fixed in a collar 434 at the bottom end of the cage 410.

The bottom end of the runner 420 carries a radial flange which underlies the top wall of the cage 410 and is rotatably supported by ball bearings 436 carried by a spring reaction plate 438 biased upward by a spring 440 supported from an adjustable reaction plate 442 at the bottom of the cage 410.

Upward feed of the lap is obtained by rotating the runner 420 about the lap shaft 422. For this purpose the upper end of the runner 420 is positioned in slidable meshing engagement with an elongated drive gear 448, driven through bevel gears by a drive feed motor 450. The feed motor 450 is controlled by a normally open switch 490, corresponding to the switch 90 of FIG. 2.

Operation of the modification of FIG. 9 is as follows. Workpiece 452 is fixed on a table 454 above the starting position of the lap 428. Operation of the reciprocation motor 418 continuously reciprocates the cage 410 through strokes of predetermined length in a fixed position on the standard 412. In the downward reciprocation strokes of the cage 410, its upper wall engages the bottom flange of the runner 420 and positively drives the lap shaft 422 and the lap 428 through a downward or return stroke. In each upward stroke of the cage 410 the driving force is transmitted from the bottom end of the cage 410 through the spring 440 and the ball bearings 436 to the runner 420, to move the lap shaft 422 and the lap 428 in an upward stroke. In such upward stroke, the lap-moving force is limited by the yielding strength of the spring 440, to a force less than sufficient to overcome a predetermined resistance of the workpiece 452 to upward movement of the lap 428. Accordingly, the action will be similar to that previously described, and upward stroke movements of the lap 428 will be interrupted at an intermediate arrest point in the normal stroke range.

When the lap 428 and lap shaft 422 move forward in their upward strokes beyond the intermediate arrest point, the upper end of the runner 420 will engage and close the switch 490, and this in turn will actuate the feed motor 450. Each such actuation will rotate the drive gear 448 and the runner 420, to thread the runner downward on the lap shaft 422, and hence to feed the lap shaft 422 upward relative to the reciprocating cage 410.

This arrangement of engaging the lap in the workpiece from below has the advantage that the workpiece cavity lies above the lap and can be filled with lapping compound which feeds to the lap as the work progresses.

I claim as my invention:

1. A surface abrading machine, comprising
    a holder for mounting an abrading tool in cutting relation with a workpiece,
    drive means for reciprocating the holder through forward and return strokes within a predetermined stroke range,
    feeding means to advance the stroke range relative to the workpiece,
    means to limit the forward-stroke force of the holder to a predetermined force less than sufficient to overcome a predetermined resistance between the workpiece and the tool in the abrading operation, whereby such resistance will arrest the forward movement of the holder at an intermediate point in its forward stroke,
    and means to actuate the feeding means to advance the stroke range in response to forward progress of the point at which such arrest occurs.

2. A machine as defined in claim 1 in which said holder is yieldingly biased forward relative to the feed means,
    and said drive means includes power means to actuate the holder through return strokes against said forward bias.

3. A lapping machine as defined in claim 1 in which said holder is yieldingly biased forward relative to the feed means,
    and said drive means is connected to said holder through a lost-motion connection and has a retraction stroke in which it drives the holder in a return direction and a forward stroke in which it controls the rate of movement of the holder in its forward stroke.

4. A surface abrading machine as defined in claim 1 in which said feeding means is operative to advance the holder relative to the drive means.

5. A machine as defined in claim 1, with the addition of control means responsive to actuation of said feed means and operative to stop the drive means a predetermined interval after each actuation of said feed means, whereby to stop such drive means if the feed means is not reactuated within said interval.

6. A surface abrading machine, comprising
    a holder for mounting an abrading tool in abrading relation with a workpiece,
    means for advancing said holder forward relative to the workpiece and including yieldable thrust-limiting means limiting the forward thrust of the holder to less than sufficient to overcome a predetermined resistance of the work to the tool, whereby forward movement of the holder under such thrust will be stopped in arrested position by such resistance,
    and means to intermittently retract the holder within a predetermined stroke range from its arrested position and alternately release the holder for forward movement under such limited thrust, whereby the holder will be reciprocated for cutting action over a stroke range terminating forwardly at the position of arrest by work resistance,
    said advancing means being operative to progress the holder forward relative to the work as such cutting action advances the position at which said predetermined resistance occurs.

7. A surface abrading machine as set forth in claim 6, in which said means to retract the holder comprises a positive drive which drives the holder against the yieldable thrust-limiting means.

8. A surface abrading machine as set forth in claim 7, in which said means to retract and release the holder comprises means to control the rate of forward release movement of the holder.

9. A surface abrading machine, comprising
    a holder for mounting an abrading tool in abrading relation with a workpiece,
    a carriage mounted for feed movement and supporting said holder for reciprocating movement through abrading strokes within a predetermined stroke-range relative to the carrier,
    yieldable biasing means urging said holder forward relative to said carriage with a limited force,
    drive means for alternately driving said holder in retraction strokes against said biasing means and allowing said holder to be thrust forward in forward strokes by said biasing means,
    said biasing means exerting on said holder a limited forward thrust force less than sufficient to move the abrading tool against a predetermined resistance from the work, whereby the forward strokes of the holder will be arrested at an intermediate point in the stroke range, and means responsive to movement of the holder beyond such predetermined point for feeding said carriage forward an increment equivalent to a fraction of the holder stroke-length distance.

10. A surface abrading machine as defined in claim 9 with the addition that said carriage-feeding means comprises a switch positioned to be closed in response to movement of the holder beyond a predetermined point in its forward stroke, and a feed motor controlled by said switch and operatively connected to feed the carriage.

11. A surface abrading machine as defined in claim 10 with the addition of, a feed-reversal switch positioned to be closed when the carriage reaches a predetermined feed position and operative to reverse the feed motor for return movement of the carriage to retract the tool from the workpiece.

12. A surface abrading machine as defined in claim 11, with the addition of means to deenergize the feed motor and stop the machine when the carriage is returned to a predetermined position.

13. A surface abrading machine as defined in claim 9 with the addition of means for rotating said holder during its reciprocation.

14. A surface abrading machine as defined in claim 9 with the addition of means for rotating the workpiece about the axis of the tool during the abrading operation.

15. An automatic lapping machine, comprising a lap holder for mounting a lap in lapping relation with a workpiece, a carriage supporting said holder for rectilinear reciprocating forward and return movements within a predetermined stroke range relative to the carrier, said carriage being mounted for feed movement parallel with said strokes, drive means for reciprocating the holder relative to the carriage in such stroke range, feeding means to advance the carriage, means to limit the forward thrust force of the holder to a force less than sufficient to overcome a predetermined resistance of the work to forward movement of the lap, whereby such resistance will arrest the forward movement of the holder at an intermediate point in its forward stroke, and means to actuate the feeding means to advance the carriage in response to forward progress of the point at which such arrest occurs.

16. An automatic lapping machine, comprising a lap holder for mounting a lap in lapping relation with a workpiece, a carriage supporting said holder for rectilinear reciprocating forward and return movements within a predetermined stroke range relative to the carriage, said carriage being mounted for feed movement parallel with said strokes, feeding means to advance the carriage, drive means for reciprocating the holder relative to the carriage, said drive means including resilient biasing means exerting forward thrust on the lap holder and yieldable to limit the thrust force to a force less than sufficient to overcome a predetermined resistance of the work to forward movement of the lap, whereby resistance will arrest forward movement of the holder at an intermediate point in its forward stroke, and means responsive to forward progress of such arrest point relative to the carriage, for actuating the feed means to advance the carriage.

17. An automatic lapping machine as defined in claim 16 in which said arrest-point responsive means comprises a switch positioned to be actuated in response to movement of the lap holder beyond a predetermined position relative to the carriage, and said feeding means comprises a motor controlled by said switch.

18. An automatic lapping machine as defined in claim 16 in which said drive means comprises a cam rotatable in the carriage, a cam follower connected to the holder and forwardly engaged with the cam, and yieldable biasing means urging the cam follower and holder forward relative to the carriage, there being a lost-motion connection between the cam and holder whereby the holder may be arrested at an intermediate point of its forward stroke.

19. An automatic lapping machine, comprising a carriage mounted for rectilinear feeding movement toward a workpiece, a lap shaft mounted for rectilinear reciprocation in the carriage in forward and return strokes within a predetermined stroke range, a cam follower connected to said shaft, a cam rotatable in the carriage and arranged to exert rearward thrust to drive the shaft through return strokes, there being a lost-motion connection between the cam and lap shaft to prevent forward drive of the shaft from the cam, and yieldable biasing means acting between the carriage and lap shaft to urge the shaft through forward strokes, said biasing means being constructed and arranged to exert limited forward thrust on the shaft of a magnitude adapted to be overcome by a predetermined resistance of the work to forward movement of the lap, whereby such resistance will arrest forward movement of the shaft at an arrest point ahead of the forward end of the shaft stroke range, and a switch positioned to be actuated with movement of the shaft beyond said arrest point, and connected for controlling feed movement of the carriage.

20. A lapping machine as defined in claim 19 which includes feed means controlled by said switch and arranged to advance the carriage not more than a predetermined maximum distance during each reciprocation cycle of the shaft, such maximum distance being a fraction of the stroke length distance.

21. A surface abrading machine, comprising a holder for mounting an abrading tool in cutting relation with a workpiece, drive means for driving the holder in abrading movement, and feeding means to advance the position of the moving holder relative to the workpiece, said machine including resilient force-limiting means limiting the force with which the holder urges the tool forward, to less than a predetermined resistance between the workpiece and the tool, whereby such resistance will arrest forward movement of the holder at an arrest point at which the resilient means biases the holder forward, said feeding means being operative to advance the holder in response to forward progress of the point at which such arrest occurs.

22. A surface abrading machine as defined in claim 21, in which said feeding means includes sensing means to sense forward progress of the point at which such arrest occurs and feed drive mechanism actuated in response to said sensing means.

References Cited in the file of this patent
UNITED STATES PATENTS

| | | |
|---|---|---|
| 2,195,060 | Wallace et al. | Mar. 26, 1940 |
| 2,284,134 | Connor | May 26, 1942 |